Feb. 28, 1967     P. F. JETTINGHOFF     3,306,395
EXHAUST SYSTEM COMPRISING SILENCERS WITH
REDUCED WALL CONNECTIONS
Filed March 5, 1965
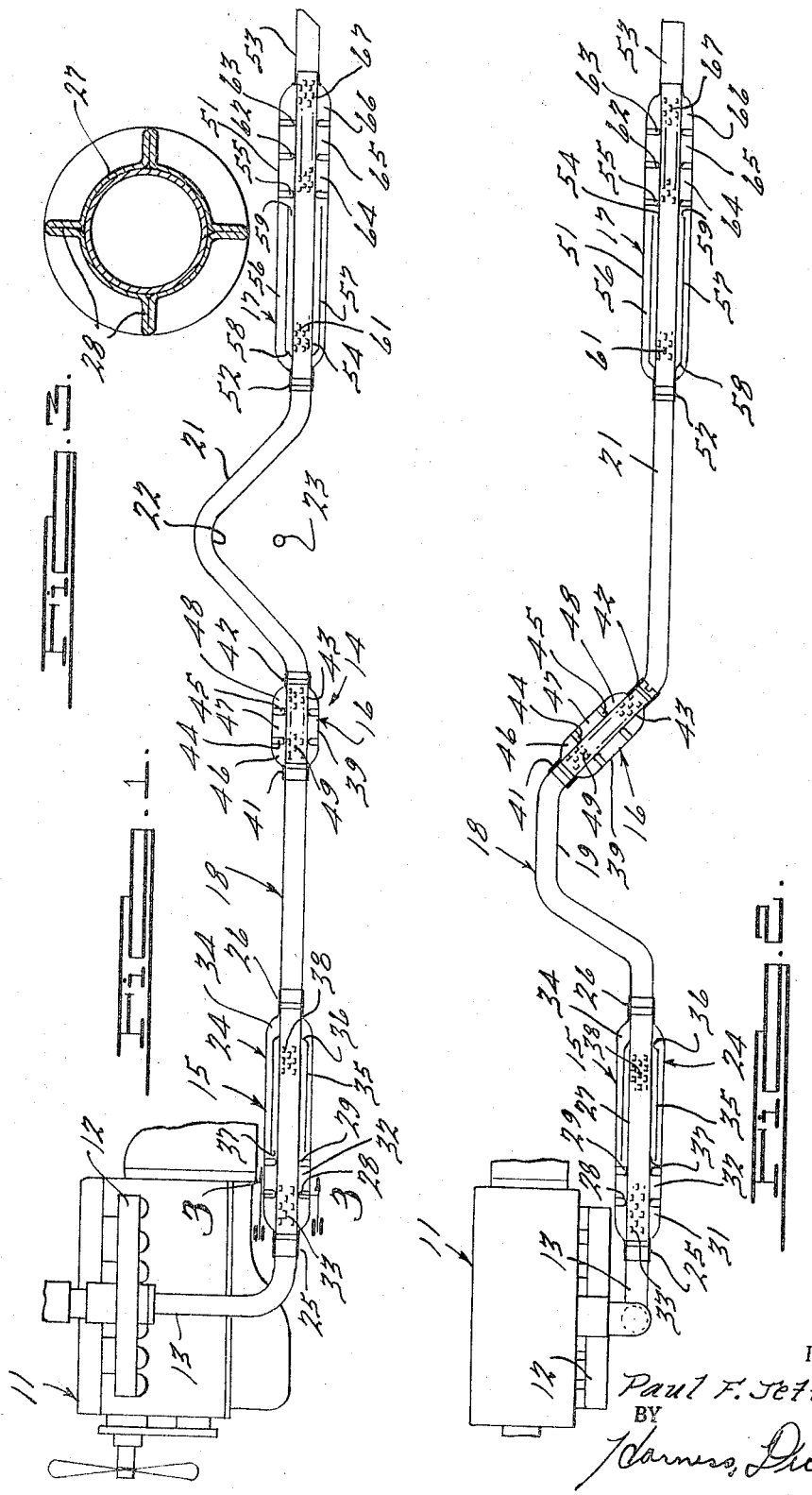
INVENTOR.
Paul F. Jettinghoff
BY
Harness, Dickey & Pierce
ATTORNEYS.

United States Patent Office 3,306,395
Patented Feb. 28, 1967

3,306,395
EXHAUST SYSTEM COMPRISING SILENCERS WITH REDUCED WALL CONNECTIONS
Paul F. Jettinghoff, Jackson, Mich., assignor to Walker Manufacturing Company, a corporation of Delaware
Filed Mar. 5, 1965, Ser. No. 437,445
6 Claims. (Cl. 181—59)

This invention relates to exhaust systems for internal combustion engines and more particularly to exhaust systems for automotive vehicles.

It is an object of this invention to provide a multi-part exhaust system containing a multiplicity of silencing components that are designed and arranged so as to silence effectively the whole spectrum of exhaust gas sound emanating from an internal combustion engine.

It is another object of this invention to provide an exhaust system that is small in diameter and, therefore, takes a minimum of space beneath the body of an automotive vehicle.

A further object of the invention is to provide an exhaust system that has a minimum back pressure and in which the silencing components are distributed over the entire length of the system.

The invention accomplishes the foregoing and other objects by means of an elongated exhaust pipe having an inlet end and an outlet end between which are placed at least two silencing units. Each of the silencing units comprises an outer pipe having a reduced diameter inlet bushing at one end thereof and a reduced diameter outlet bushing at its other end. An inner pipe having an inlet end supported by the inlet bushing and an outlet end supported by the outlet bushing extends through the outer pipe. A reduced diameter portion of the outer pipe engages the outer periphery of the inner pipe between the bushings to define two silencing chambers. An intermediate pipe is affixed at one of its ends to the periphery of the inner pipe within one of the silencing chambers and extends at a spaced distance from the inner pipe along the inner pipe within the chamber. Inlet perforations are provided in the inlet pipe adjacent to the one end of the intermediate pipe whereby the first silencing chamber functions as a Helmholtz tuner. The portion of the inner pipe that extends through the second silencing chamber is provided with a plurality of longitudinally spaced perforations whereby the second chamber functions as a spit chamber. The Helmholtz tuner of one of the silencing units is tuned to eliminate one mode of vibrations of the exhaust system and the Helmholtz tuner of the other silencing unit is tuned to eliminate another mode of vibrations.

The invention is illustrated in the accompanying drawings, in which:

FIGURE 1 is a schematic side elevational view of an exhaust system for the internal combustion engine of an automotive vehicle embodying this invention;

FIGURE 2 is a top plan view of the exhaust system shown in FIGURE 1; and

FIGURE 3 is a cross sectional view taken along the line 3—3 of FIGURE 1.

Referring now in detail to the drawings, an automotive internal combustion engine is illustrated schematically and identified by the reference numeral 11. The engine 11 has an exhaust manifold 12 that discharges into an exhaust inlet pipe 13. The outlet end of the exhaust inlet pipe 13 communicates with an exhaust silencing system embodying this invention and indicated generally by the reference numeral 14. The exhaust inlet system 14 comprises a first silencer 15, a second silencer 16 and a third silence 17. The silencers 15 and 16 are interconnected by a pipe 18 that has an offset portion 19 to permit the exhaust system to conform to the shape of the frame (not shown) of the vehicle so that the exhaust system may be conveniently suspended therefrom. The silencer 16 is connected to the silencer 17 by a pipe 21 having a kick-up 22 to clear a rear axle 23 of the vehicle.

The silencer 15 comprises an outer shell formed by an outer pipe 24 that has a reduced diameter section 25 at one end that forms an inlet bushing that is connected to the outlet end of the exhaust inlet pipe 13. The other end of the outer pipe 24 has a reduced diameter portion 26 that forms an outlet bushing for the silencer 15. An inner pipe 27 extends completely through the silencer 15 and is supported at its inlet end by the inlet bushing 25 and at its outlet end by the outlet bushing 26. The outer pipe 24 has two reduced diameter portions 28 and 29 formed by pinched in portions thereof, as shown in FIGURE 3, that form two silencing chambers 31 and 32 in the area between the outer pipe 24 in the inner pipe 27. The inner pipe 27 is provided with perforations or louvers 33 along the portions of its length that extends through the chambers 31 and 32 so that the chambers 31 and 32 may function as spit chambers for absorbing the energy of high frequency sound waves emanating from the engine 11.

The reduced diameter portion 29 of the outer pipe 24 and the outlet bushing 26 define a third silencing chamber 34 around the inner pipe 27. An intermediate pipe 35 is positioned within the third silencing chamber 34 and has a reduced diameter portion 36 that engages the inner pipe 27 around its periphery contiguous to the outlet bushing 26 and is affixed thereto. The opposite end of the intermediate pipe 35 is open, as at 37, into the chamber 34. A plurality of louvers or perforations 38 are provided in the inner pipe 27 adjacent to the reduced diameter portion 36 to provide an inlet to the intermediate pipe 35 so that the area between the intermediate pipe 35 and the inner pipe 27 functions as a tuning neck for the silencing chamber 34. The chamber 34 therefore acts as a Helmholtz silencer.

The silencer 16 comprises an outer pipe 39 that is formed with a reduced diameter portion 41 at one end that forms an inlet bushing for connection to the outlet end of the pipe 18. The outer pipe 39 has a reduced diameter portion 42 at its other end that forms an outlet bushing for connection to the pipe 21. An inner pipe 43 extends between and is supported by the bushings 41 and 42. The space between the inner pipe 43 and the outer pipe 39 forms a silencing chamber that is divided into three units by reduced diameter pinched down sections 44 and 45 of the outer pipe 39. The three units are identified by the numerals 46, 47 and 48 in the drawings. The inner pipe 43 is provided with a plurality of longitudinally spaced louvers or perforations 49 along its length so that the chambers 46, 47 and 48 function as spit chambers to absorb the energy of high frequency sounds emanating from the engine 11.

The silencer 17 comprises an outer shell or pipe 51 that is formed with a reduced diameter portion 52 at one end that functions as an inlet bushing for connecting the silencer 17 to the outlet end of the pipe 21. The other end of the outer pipe 51 has a reduced diameter portion 53 that may form an outlet bushing for connection to an exhaust pipe or may function for the purpose of discharging the exhaust gases directly to the atmosphere. An inner pipe 54 extends between the reduced diameter portions 52 and 53 and is supported thereby. The inner pipe 54 and the outer pipe 51 define an annular area therebetween.

The area is divided by a reduced diameter pinched down portion 55 of the outer pipe 51 into a first silencing chamber 56. An intermediate pipe 57 is positioned within the chamber 56 and has a reduced diameter portion 58 that engages the inner pipe 54 adjacent to the inlet bushing 52 and is affixed thereto. The other end of the intermediate pipe 57 defines an open annular gap 59 around the inner pipe 57. A plurality of perforations or louvers 61 are formed in the inner pipe 54 adjacent to the reduced diameter portion 58 of the intermediate pipe 57. The area between the intermediate pipe 57 and the inner pipe 54, therefore, acts as a tuning neck and the chamber 56 functions as a Helmholtz tuner.

The outer pipe 51 is formed with a pair of reduced diameter pinched down portions 62 and 63 between the reduced diameter portion 55 and the outlet bushing 53. The inner diameter of the pinched down portions 62 and 63 contact the inner pipe 54 around its periphery and define three chambers, 64, 65 and 66. The inner pipe 54 is provided with a plurality of perforations or louvers 67 along the portion of its length that extends through the chambers 64, 65 and 66 so that these chambers may function as spit chambers for absorbing the energy of high frequency sound waves emitted from the engine 11.

It should be readily apparent that the disclosed exhaust system provides a compact silencing assembly along the length of the system which effectively removes all objectionable sounds from the engine exhaust. The Helmholtz tuner provided in the silencer 15 is tuned to absorb the energy of the seventh mode of the sound frequencies emanating from the exhaust system and is located as closely as possible to an anti-node point of this frequency. The Helmholtz tuner in the silencer 17 is tuned to absorb the eleventh mode of sound frequencies emanating from the exhaust system and is located as closely as possible to an anti-node of this frequency.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A silencing device for the exhaust system of an internal combustion engine comprising an outer pipe having a reduced diameter inlet bushing at one end thereof and a reduced diameter outlet bushing at its other end, an inner pipe having an inlet end supported by said inlet bushing and an outlet end supported by said outlet bushing, an intermediate pipe affixed at one of its ends to the periphery of said inner pipe and extending at a spaced distance therefrom along a portion of the length of said inner pipe adjacent to one of said bushings, a reduced diameter portion of said outer pipe being in engagement with said inner pipe around its periphery to define with said one of said bushings a first silencing chamber encompassing said intermediate pipe, the other end of said intermediate pipe being open to said silencing chamber, a plurality of perforations formed in said inner pipe adjacent to said one end of said intermediate pipe whereby said intermediate pipe functions as a tuning neck for said first silencing chamber, and a plurality of perforations formed in the portion of said inner pipe between said reduced diameter portion and the other of said bushings for forming a silencing chamber between said portion of said inner pipe and the portion of said outer pipe between said reduced diameter portion and the other of said bushings which functions as a spit chamber.

2. A silencing device as set forth in claim 1 wherein the intermediate pipe is affixed to the inner pipe contiguous to the inlet bushing and the spit chamber is formed adjacent the outlet bushings.

3. A silencing device as set forth in claim 1 wherein the intermediate pipe is affixed to the inner pipe adjacent to the outlet bushing whereby the first silencing chamber is positioned adjacent to said outlet bushing and the spit chamber is formed in the portion of said silencing device between the inlet bushing and the reduced diameter portion of the outer pipe.

4. A silencing device as set forth in claim 1 wherein the portion of the outer pipe between the reduced diameter portion and the other of the bushings is formed with a plurality of longitudinally spaced reduced diameter portions that engage the inner pipe to divide the spit chamber into a plurality of longitudinally spaced chambers.

5. An exhaust system for an internal combustion engine comprising an elongated exhaust pipe, a first and a second silencer positioned along said exhaust pipe, each of said silencers comprising an outer pipe having a reduced diameter inlet bushing at one end thereof and a reduced diameter outlet bushing at its other end, an inner pipe having an inlet end supported by said inlet bushing and an outlet end supported by said outlet bushing, an intermediate pipe affixed at one of its ends to the periphery of said inner pipe and extending at a spaced distance therefrom along a portion of the length of said inner pipe adjacent to one of said bushings, a reduced diameter portion of said outer pipe being in engagement with said inner pipe around its periphery to define with said one of said bushings a first silencing chamber encompassing said intermediate pipe, the other end of said intermediate pipe being open to said silencing chamber, a plurality of perforations formed in said inner pipe adjacent to said one end of said intermediate pipe whereby said intermediate pipe functions as a tuning neck for said first silencing chamber and a plurality of perforations formed in the portion of said inner pipe between said reduced diameter portion and the other of said bushings for forming a silencing chamber between said portion of said inner pipe and the portion of said outer pipe between said reduced diameter portion and the other of said bushings which functions as a spit chamber, the first silencing chamber of one of said silencers being tuned to eliminate the seventh mode of sound frequencies emanating from the exhaust system and being positioned contiguous to an anti-node of the seventh mode, the first silencing chamber of said second silencer being tuned to absorb the eleventh mode of sound frequencies emanating from the exhaust system and being positioned contiguous to an anti-node of said eleventh mode.

6. A silencing system as set forth in claim 5 wherein the intermediate pipe of said first silencer is affixed to the inner pipe adjacent to the outlet bushing whereby the first silencing chamber is positioned adjacent to said outlet bushing and the spit chamber is formed in the portion of said silencing device between the inlet bushing and the reduced diameter portion of the outer pipe, and the intermediate pipe of the second silencer is affixed to the inner pipe contiguous to the inlet bushing and the spit chamber is formed adjacent the outlet bushing.

References Cited by the Examiner

UNITED STATES PATENTS

| | | | |
|---|---|---|---|
| 2,099,887 | 11/1937 | Heath | 181—36 |
| 2,297,046 | 9/1942 | Bourne | 181—35 |
| 2,367,753 | 1/1945 | Buck | 181—35 |
| 3,196,976 | 7/1965 | Power et al. | 181—61 |
| 3,219,142 | 11/1965 | Deremer | 181—61 X |

FOREIGN PATENTS

| | | |
|---|---|---|
| 1,351,921 | 12/1963 | France. |
| 892,780 | 3/1962 | Great Britain. |

RICHARD B. WILKINSON, *Primary Examiner*

R. S. WARD, *Assistant Examiner.*